(12) United States Patent
Koike et al.

(10) Patent No.: US 7,045,709 B2
(45) Date of Patent: May 16, 2006

(54) CORRUGATED TUBE

(75) Inventors: Masato Koike, Susono (JP); Koji Nishina, Susono (JP); Atsushi Sugiyama, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/152,157

(22) Filed: Jun. 15, 2005

(65) Prior Publication Data

US 2005/0274535 A1 Dec. 15, 2005

(30) Foreign Application Priority Data

Jun. 15, 2004 (JP) ............................ P2004-176852

(51) Int. Cl.
*H02G 3/04* (2006.01)

(52) U.S. Cl. ..................... 174/48; 174/68.3; 174/72 A; 174/68.1; 138/121; 138/156

(58) Field of Classification Search .................. 174/48, 174/49, 60, 67, 68.3, 95, 99 R, 68.1, 72 R, 174/97, 96, 135, 72 A; 220/3.2, 3.8, 3.5; 385/134, 135; 52/220.1, 220.3, 220.7, 220.8, 52/249; 439/207, 208, 214, 215; 138/121, 138/128, 169, 156
See application file for complete search history.

(56) References Cited

U.S. PATENT DOCUMENTS

| | | | | |
|---|---|---|---|---|
| 3,694,563 A | * | 9/1972 | Monds et al. | 174/68.3 |
| 4,296,157 A | * | 10/1981 | Conti | 138/121 |
| 4,384,167 A | * | 5/1983 | Nestor | 174/135 |
| 6,078,009 A | * | 6/2000 | Kawamura | 174/68.3 |
| 6,137,055 A | * | 10/2000 | Kawamura | 174/68.3 |
| 6,603,074 B1 | * | 8/2003 | Seo | 174/135 |
| 6,843,276 B1 | * | 1/2005 | Tadokoro | 138/121 |
| 6,938,645 B1 | * | 9/2005 | Domingues Duarte et al. | 138/121 |

FOREIGN PATENT DOCUMENTS

| | | |
|---|---|---|
| JP | 62-16888 U | 1/1987 |
| JP | 2000-287331 A | 10/2000 |

* cited by examiner

*Primary Examiner*—Dean A. Reichard
*Assistant Examiner*—Angel R. Estrada
(74) *Attorney, Agent, or Firm*—Sughrue Mion, PLLC

(57) ABSTRACT

A corrugated tube having an elastic material in which a slit is formed over the entire length of a cylindrical periphery of a flexible tube main body, and a wire harness is contained with the slit being in a closed state. Both ends of the slit are formed over a predetermined peripheral width with a soft material composition having a lubricant and a soft material having a hardness less than that of an outer skin of electric wires that constitute a wire harness to be contained. The corrugated tube is capable of accommodating a wire harness with no injury and enabling a smooth wire harness accommodating operation.

9 Claims, 2 Drawing Sheets

FIG. 3    PRIOR ART
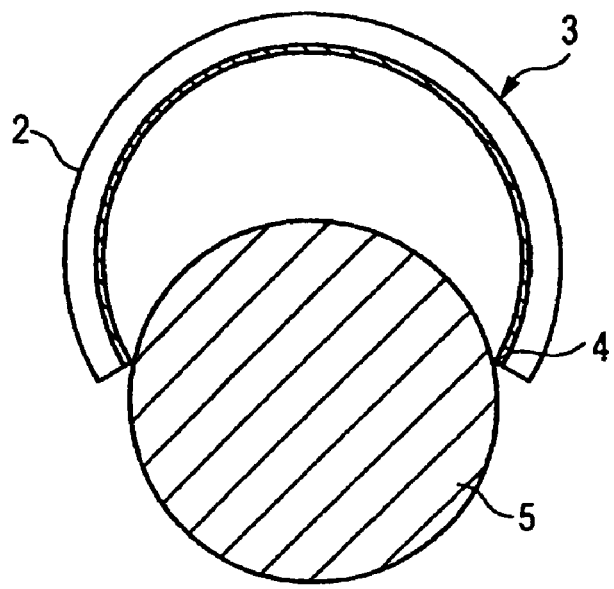
FIG. 4
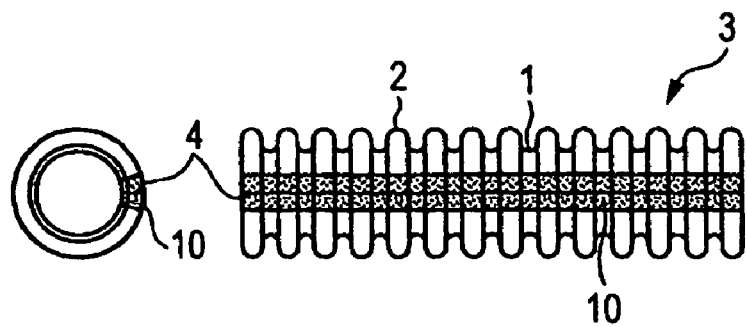

CORRUGATED TUBE

BACKGROUND OF THE INVENTION

The present invention concerns a corrugated tube which is laid down in a state of accommodating a wire harness at the inside thereof along a vehicle panel or the like.

As shown, for example, in FIG. 2, an related corrugated tube 3 of this type comprising an elastic material in which a slit 4 is formed over the entire length of a cylindrical periphery of a flexible bellows-like tube main body having smaller diametrical portions 1 and larger diametrical portions 2 continuously formed alternately in the axial direction thereof has been known (for example, Patent Literature 1). In the corrugated tube 3 described above, the slit 4 at one end is dilated to form an opening, a wire harness 5 is inserted to the opening and then the corrugated tube 3 is moved in the direction of an arrow in the drawing so as to move slidably at the outer peripheral surface of the wire harness 5, thereby gradually accommodating the wire harness 5. Then, after accommodating the wire harness 5 as far as the other end of the slit 4, the slit 4 is kept in a closed state by the resiliency of the tube main body and the wire harness 5 is kept in the accommodated state without protruding from the corrugate tube 3.

However, since a synthetic resin, for example, a polypropylene which is rigid to some extent is used as the elastic material for protecting the wire harness 5 accommodated therein, the outer skin of electric wires that constitute the wire harness 5 may sometimes be in contact with the open end edge of the slit 4 and injured during the accommodating operation as shown by a cross sectional view perpendicular to the axial line in FIG. 3.

In view of the above, as shown in FIG. 4 (drawing on the right is a front elevational view as viewed from the side in which the slit 4 is formed and the drawing on the left is a left side elevational view thereof), a corrugated tube 3 is proposed in which a soft portion 10 comprising a rubber material (ethylene propylene rubber: EPDM) with Shore A Hardness of about 35 to 50 (ethylene propylene rubber EPDM) is formed on both ends of the slit 4 over a predetermined peripheral width is formed (for example, Patent Literature 2).

However, since the frictional resistance of the slit portion 4 is large in the corrugated type tube 3 described above, this results in a problem that sliding movement with the wire harness 5 does not proceed smoothly in the accommodating operation to make in the operation efficiency poor.

Patent Literature 1: JP-UM-A-62-16888
Patent Literature 2: JP-A-2000-287331

SUMMARY OF THE INVENTION

The present invention has been achieved for solving the problem described above and it intends to provide a corrugated tube capable of accommodating a wire harness with no injury and capable of conducting the wire harness accommodating operation smoothly.

In order to accomplish the above purpose, a corrugated tube of the present invention is characterized by having the follows arrangement, (1) A corrugated tube for a accommodating a wire harness comprising:

a flexible tube body that is made of an elastic material and includes a slit formed over an entire length thereof in an axial direction, wherein opposite ends of the slit are formed over a predetermined peripheral width with a soft material composition comprising a soft material having a hardness less than that of an outer skin of the wire harness and a lubricant.

(2) A corrugated tube according to (1), wherein the soft material includes one of a rubber material and a material comprising a polyolefin resin and an ethylene propylene rubber or a styrenic elastomer, and wherein the lubricant includes one of an amide type lubricant and a metal soap.

(3) A corrugated tube according to (2), wherein the soft material composition comprises from 0.05 to 2.0% by mass of the amide type lubricant.

(4) A corrugated tube according to (2), wherein the soft material composition comprises from 0.05 to 3.0% by mass of the metal soap.

(5) A corrugated tube according to (1), wherein edges of the ends of the slit are subjected to be rounded.

(6) A corrugated tube for accommodating a wire harness comprising:

a flexible tube body that is made of an elastic material and includes a slit formed over an entire length thereof in an axial direction, wherein opposite ends of the slit are formed over a predetermined peripheral width with a soft material having a hardness less than that of an outer skin of the wire harness; and a coating of a lubricant that is formed on a surface of the soft material.

(7) A corrugated tube according to (6), wherein the soft material includes one of a rubber material and a material comprising a polyolefin resin and an ethylene propylene rubber or a styrenic elastomer, and wherein the lubricant includes one of an amide type lubricant and a metal soap.

(8) A method of forming a corrugated tube for accommodating a wire harness, the method comprising:

integrally molding an elastic material and a soft material composition comprising a soft material having a hardness less than that of an outer skin of the wire harness and a lubricant into a tube shape so that the soft material composition extends in an axial direction of the tube shape; and forming a slit on a center of the soft material composition over an entire length thereof in the axial direction.

(9) A method of forming a corrugated tube for accommodating a wire harness, the method comprising:

integrally molding an elastic material and a soft material having a hardness less than that of an outer skin of the wire harness into a tube shape so that the soft material extends in an axial direction of the tube shape;

forming a slit on a center of the soft material over an entire length thereof in the axial direction; and coating a lubricant on a surface of the soft material.

The corrugated tube according to the invention can contain a wire harness with no injury and can conduct the accommodating operation for the wire harness smoothly.

BRIEF DESCRIPTION OF THE DRAWINGS

FIG. 3 is a cross sectional view for explaining the disadvantage upon inserting a wire harness into the corrugated tube shown in FIG. 2; and FIG. 4 is a view showing another embodiment of the related corrugated tube in which the drawing on the right is a front elevational view as viewed from the side formed with a slit and the drawing on the left is a left side elevational view.

DETAIL DESCRIPTION OF PREFERRED EMBODIMENTS

A corrugated tube according to the present invention is to be described with reference to the drawings.

Figure 1:
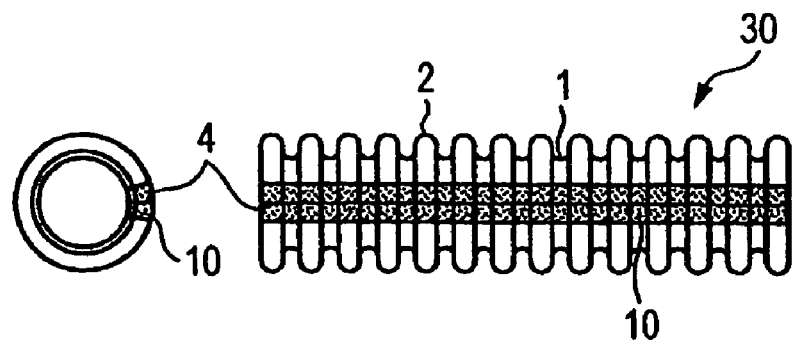
FIG. 1 is a view showing a corrugated tube according to the present invention in which the drawing on the right is a front elevational view as viewed from the side formed with a slit and the drawing on the left is a left side elevational view.

FIG. 1 is a view showing a corrugated tube according to the invention in which the drawing on the right is a front elevational view as viewed from the side formed with a slit and the drawing on the left is a left side elevational view. As shown in the drawings, a corrugated tube 30 of the invention that is structurally identical with the corrugated tube 3 shown in FIG. 4, includes a bellows-like tube main body made of an elastic material such as a polypropylene in which smaller diametrical portions 1 and larger diametrical portions 2 are continuously formed alternately in the axial direction, a slit 4 is formed over the entire length of the cylindrical periphery and, further, a soft portion 10 is provided at both ends of the slit 4. Then, in the corrugated tube 30 of the invention, the soft portion 10 is formed of a soft material composition comprising a soft material and a lubricant as the first embodiment. Alternatively, the soft portion 10 is formed only of a soft material, and a cover film comprising the lubricant is formed on the surface thereof as a second embodiment.

The soft material has no particular restriction so long as it is a material having a hardness lower than that of the outer skin of electric wires that constitute the wire harness to be contained, preferably, a hardness according to JIS K 7125 of from HDA 80 to HDD 45, more preferably, from HDD 30 to HDD 40 which can be molded integrally with the elastic material that forms a portion other than the soft portion 10. Specifically, it can include, for example, a rubber material such as EPDM like the related material but with no particular restriction thereto. Furthermore, it can also include a material comprising a polyolefin resin, and an ethylene propylene rubber or a styrenic elastomer. The portion other than the soft portion 10 may be identical with that in the related art and is formed of a material having a hardness according to JIS K 7215 of from HDD 50 to 90 and, preferably, HDD from 60 to 70.

As the lubricant, an amide type lubricant such as oleamide or erucamide, or a metal soap such as zinc stearate can be used.

In the first embodiment, the comprising ratio of the lubricant in the soft material composition is from 0.05 to 2.0% by mass and, preferably, from 0.1 to 0.5% by mass for the amide type lubricant, and from 0.05 to 3.0% by mass and, preferably, from 0.1 to 2.0% by mass for the metal soap. In each of the lubricants, in a case where the comprising ratio is less than the lower limit value described above, the effect of reducing the frictional resistance is insufficient failing to improve the operation efficiency during the accommodating operation of the wire harness. On the other hand, in a case where the comprising rate is more than the upper limit value described above, it results in such a disadvantage that an excess lubricant deposits on the electric wires that constitute the wire harness 5 or deposits on operators' hands.

For manufacturing the corrugate tube 30 of the first embodiment, the soft portion 10 and other portion are molded simultaneously by a so-called two-color molding (coinjection molding) method. That is, a soft material composition formed by sufficiently blending and kneading the soft material and the lubricant is extruded from a first nozzle, while a material forming other portion than the soft portion 10 (for example, polypropylene) is extruded from a second nozzle simultaneously to conduct molding. Then, the obtained molding product is cut over the entire length in the axial direction along the center of the soft portion 10 to form a slit 4. Upon forming the slit 4, rounding may be applied to the end edge.

Further, the corrugate tube 30 of the second embodiment may be manufactured in the same manner by molding a tube main body having the soft portion 10 only composed of a soft material by a two-color molding (coinjection molding) method, forming a slit 4, and further coating a solution in which a lubricant is dissolved in an appropriate solvent over the entire surface of the soft portion 10, and then drying them. There is no particular restriction for the coating method, and known coating means such as brush coating or spray coating may be adopted. However, since the solvent, depending on the type, may permeate the soft portion 10 to swell the soft material, a less swelling solvent is selected in accordance with the soft material. While there is no restriction on the thickness of the coating film, it is suitably from 1 to 5 μm taking durability into consideration.

Figure 2:
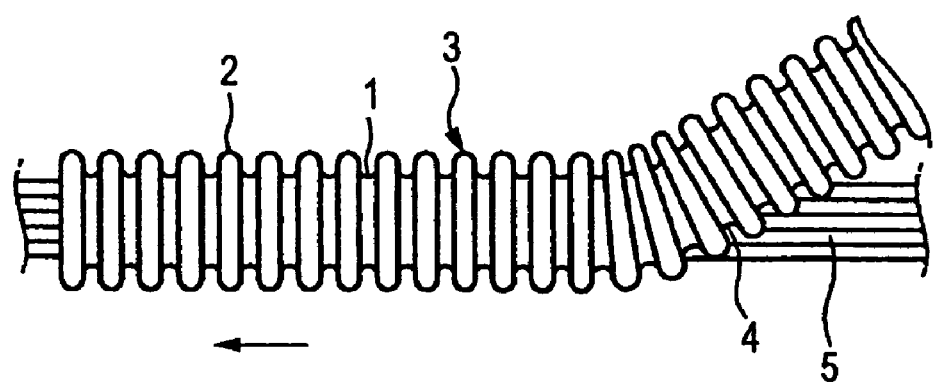
FIG. 2 is a side elevational view showing an embodiment of a related corrugated tube, and a view for explaining the mounted state thereof.

For accommodating the wire harness in the corrugate tube 30 of the invention, the same operation as in the related corrugated tube having the slit is conducted. That is, as shown in FIG. 2, the slit 4 at one end of the corrugated tube 30 is dilated, the wire harness 5 is inserted into the opening and then the corrugated tube 30 is moved in the direction of the arrow in the drawing under sliding movement at the outer peripheral surface of the wire harness 5. In this case, since both ends of the slit 4 are formed of the soft material 10 in the corrugated tube 30 according to the invention, it does not injure the outer skin of the electric wires that constitute the wire harness 5, and the lubricant for the soft portion 10 smooths the sliding movement relative to the outer peripheral surface of the wire harness 5.

Embodiment

Description is to be made further with reference to embodiments and comparative examples, but the present invention is not restricted at all to them.

Embodiment 1

0.5% by mass of oleamide was comprised with EPDM, and blended and kneaded sufficiently to prepare a soft material composition. Then, the soft material composition was extruded from a first nozzle, while propylene was extruded from a second nozzle simultaneously upon molding to obtain a tube main body of a bellows-like shape with a smaller diametrical portion 1 of 15 mm and a larger diametrical portion 2 of 19 mm, and an entire length of 500 mm in which a band like soft portion 10 with 10 mm width was formed over the entire length at the cylindrical periphery as shown in FIG. 1. Then, the soft portion was cut along the lateral center line thereof in the axial direction to form a slit 4 thereby preparing a corrugated tube A.

COMPARATIVE EXAMPLE 1

For comparison, a corrugate tube B was manufactured in the same manner as described above except for not blending oleic amide.

Embodiment 2

A coating film comprising zinc stearate was formed over the entire surface of the soft portion of the corrugated tube B to manufacture a corrugated tube C.

Evaluation for Operation Efficiency

The thus manufactured corrugated tubes A to C were used, a wire harness was contained in each of them and the operation efficiency during accommodating operation was evaluated. That is, as shown in FIG. 2, a slit at one end of the corrugated tube was dilated, a wire harness (electric wires each of 2.0 mm diameter braided by the number of 19 to 10 mm outer diameter) was inserted into the opening and then the corrugated tube was moved in the direction of the arrow shown in the drawing under sliding movement along the outer peripheral surface of the wire harness. In this case, the corrugated tube A and the corrugated tube C could be moved under sliding on the wire harness with no requirement for particularly large force, whereas the corrugated tube B was less moved under sliding on the wire harness and required a strong enforcing force.

Further, when the corrugated tubes A to C accommodating the wire harness were cut out each at the cylindrical periphery on the side opposite to the slit to take out the wire harness and the surface of the wire harness was observed visually, damages were not observed on the outer skin of the electric wires that constitute the wire harness contained in any of the corrugated tubes.

What is claimed is:

1. A corrugated tube for accommodating a wire harness comprising:
   a flexible tube body that is made of an elastic material and includes a slit formed over an entire length thereof in an axial direction,
   wherein opposite ends of the slit are formed over a predetermined peripheral width with a soft material composition comprising a soft material having a hardness less than that of an outer skin of the wire harness and a lubricant.

2. A corrugated tube according to claim 1,
   wherein the soft material includes one of a rubber material and a material comprising a polyolefin resin and an ethylene propylene rubber or a styrenic elastomer, and
   wherein the lubricant includes one of an amide type lubricant and a metal soap.

3. A corrugated tube according to claim 2, wherein the soft material composition comprises from 0.05 to 2.0% by mass of the amide type lubricant.

4. A corrugated tube according to claim 2, wherein the soft material composition comprises from 0.05 to 3.0% by mass of the metal soap.

5. A corrugated tube according to claims 1, wherein edges of the ends of the slit are subjected to be rounded.

6. A corrugated tube for accommodating a wire harness comprising:
   a flexible tube body that is made of an elastic material and includes a slit formed over an entire length thereof in an axial direction, wherein opposite ends of the slit are formed over a predetermined peripheral width with a soft material having a hardness less than that of an outer skin of the wire harness; and
   a coating of a lubricant that is formed on a surface of the soft material.

7. A corrugated tube according to claim 6,
   wherein the soft material includes one of a rubber material and a material comprising a polyolefin resin and an ethylene propylene rubber or a styrenic elastomer, and
   wherein the lubricant includes one of an amide type lubricant and a metal soap.

8. A method of forming a corrugated tube for accommodating a wire harness, the method comprising:
   integrally molding an elastic material and a soft material composition comprising a soft material having a hardness less than that of an outer skin of the wire harness and a lubricant into a tube shape so that the soft material composition extends in an axial direction of the tube shape; and
   forming a slit on a center of the soft material composition over an entire length thereof in the axial direction.

9. A method of forming a corrugated tube for accommodating a wire harness, the method comprising:
   integrally molding an elastic material and a soft material having a hardness less than that of an outer skin of the wire harness into a tube shape so that the soft material extends in an axial direction of the tube shape;
   forming a slit on a center of the soft material over an entire length thereof in the axial direction; and
   coating a lubricant on a surface of the soft material.

* * * * *